United States Patent [19]
Reid et al.

[11] Patent Number: 4,742,687
[45] Date of Patent: May 10, 1988

[54] DUAL COOLING/HEATING PROCESS AND COMPOSITION

[75] Inventors: Edward A. Reid, Westerville; F. Bert Cook, Columbus; Edgar M. Purvis, Jr., Troy; Horatio H. Krause, Jr., Columbus, all of Ohio

[73] Assignee: Columbia Gas System Service Corporation, Wilmington, Del.

[21] Appl. No.: 945,086

[22] Filed: Dec. 22, 1986

Related U.S. Application Data

[62] Division of Ser. No. 683,187, Nov. 13, 1984, Pat. No. 4,646,541.

[51] Int. Cl.$^4$ .............................................. F25B 15/00
[52] U.S. Cl. ........................................ 62/112; 62/476
[58] Field of Search ............... 62/112, 476, 238.3, 62/107, 141, 483, 487, 236, 324.2, 489

[56] References Cited

U.S. PATENT DOCUMENTS

| | | | |
|---|---|---|---|
| 2,308,665 | 1/1943 | Zellhoefer et al. | 62/112 |
| 3,389,574 | 6/1968 | McGrath | 62/476 X |
| 3,458,445 | 7/1969 | Macriss et al. | 62/112 X |
| 3,710,852 | 1/1973 | Porter | 62/476 X |
| 3,721,109 | 3/1973 | Porter | 62/476 |
| 4,085,595 | 4/1978 | Saito et al. | 62/476 |
| 4,085,596 | 4/1978 | Miyamoto et al. | 62/476 |
| 4,183,228 | 1/1980 | Saito et al. | 62/476 X |
| 4,551,991 | 11/1985 | Miyoshi et al. | 62/476 |

*Primary Examiner*—Lloyd L. King
*Attorney, Agent, or Firm*—Robert B. Watkins; Daniel H. Dunbar

[57] ABSTRACT

This invention relates to a cooling and heating system which operates on the absorption and phase change heat exchange principle. More particularly it relates to a continuous heat actuated, air cooled, double effect generator cycle, absorption system. In further aspects, this invention relates to a system constructed for use with an absorption refrigeration solution pair consisting of a nonvolatile absorbent and a highly volatile refrigerant which is highly soluble in the absorbent. A disclosed refrigerant pair are ammonia as the refrigerant and sodium thiocyanate as the absorbent. An absorption cycle is disclosed using the thermo physical properties of sodium thiocyanate/ammonia, absorption/refrigerant pair.

10 Claims, 2 Drawing Sheets

DUAL COOLING/HEATING PROCESS AND COMPOSITION

CROSS-REFERENCE

This is a division of co-pending application Ser. No. 683,187, filed Nov. 13, 1984, and issued Mar. 3, 1987 as U.S. Pat. No. 4,646,541.

FIELD OF THE INVENTION

This invention relates to a cooling and heating system which operates on the absorption and phase change heat exchange principle. More particularly it relates to a continuous heat actuated, air cooled, multiple effect generator cycle, absorption system.

In further aspects, this invention relates to a system constructed for use with an absorption refrigeration solution pair comprising a nonvolatile absorbent and a highly volatile refrigerant which is highly soluble in the absorbent. A disclosed refrigerant pair are ammonia as the refrigerant and sodium thiocyanate as the absorbent.

BACKGROUND OF THE INVENTION

There are two major types of absorption refrigeration equipment in commercial use: (1) air cooled systems using ammonia as the refrigerant and water as the absorbent, and (2) water cooled systems using water as the refrigerant and lithium bromide as the absorbent.

Although these are the major types in commercial use, and there are many patents relating to these and other types, variations have been patented from these general principles and the following are typical examples of such patents: U.S. Pat. Nos. 4,055,964—Swenson et al. 2,350,115—Katzow.

Others have demonstrated air cooled absorption refrigeration systems using other absorbent, refrigerant pairs. The following patents relate to these systems: U.S. Pat. Nos. 4,433,554—Rojay et al. and 3,483,710—Bearint.

Still others have patented water cooled refrigeration systems using other salts or other salts in combination with lithium bromide as the absorbents. The following are examples of these: U.S. Pat. Nos. 3,609,086—Modahl et al. and 3,541,013—Macriss et al.

Water cooled refrigeration circuits using the double effect generator are also in commercial use and have been patented as seen in the following patents: U.S. Pat. Nos. 3,495,420—Loweth et al., 3,389,573—Papapanu et al., 4,183,228—Saito et al., and 2,182,453—Sellew.

In absorption refrigeration and/or heating systems, the generator, sometimes called desorber, is a very important part of the system and contributes significantly to the overall efficiency. Much attention has been given to the construction of these devices, and various arrangements are shown in the following patents: U.S. Pat. Nos. 3,323,323—Phillips, 3,608,331—Leonard, and 4,127,993—Phillips, and 4,424,688—Wilkinson.

These existing air cooled absorption refrigeration circuits have demonstrated cooling coefficients of performance as high as 0.50 using various absorbent/refrigerant pairs. These systems have also been demonstrated as heating only heat pumps with a coefficient of performance of up to 1.3.

As used herein, coefficient of performance; i.e. COP, is defined as the energy transferred at the load in BTU/unit of time over the energy provided to the system in BTU/unit of time which is well understood by those skilled in the art.

Air cooled refrigeration circuits have also been demonstrated which can be reversed to provide either heating or cooling to an air conditioned space (a load) by switching the flow of an intermediate heat transfer solution typically consisting of water and antifreeze solutions such as ethylene glycol, etc.

Liquid cooled absorption refrigeration circuits using the double effect generator cycle to achieve high efficiency are commercially available. However, these systems are not suitable for use in heating a conditioned space (the heating load) since the refrigerant freezes at 32° F. and therefore cannot be used in a space heating system at ambient temperatures below approximately 40° F.

Absorption refrigeration and heat pump systems are well known in their basic operating characteristics and need little further description except to establish the definitions and context in which this invention will be later described.

In a typical system a refrigerant, water or other phase change material is dissolved in a absorbent (typically lithium bromide or other salts) and these are often called the "solution pair". The refrigerant is absorbed or desorbed (expelled) in or out of solution with the absorbent to varying degrees throughout the system and the heat of absorption is added or extracted to produce heating and cooling effects.

The solution pair enters a generator where it is subjected to heat and the applied heat desorbs (expels) the refrigerant water in the form of a vapor which is conveyed to the condenser. There, external ambient cooling condenses the refrigerant vapor to liquid, which is conveyed through an expansion valve, into an evaporator where heat is gained. In the refrigeration system operation the heat gained in the evaporator is from the cooling load.

The low pressure vapor then passes to an absorber where ambient cooling allows the absorbent solution to absorb the refrigerant vapor. The solution is then conveyed to a recuperator by a pump. The recuperator is a counterflow heat exchanger where heat from the absorbent/refrigerant solution, flowing from the generator to the absorber, heats the returning solution pair flowing from the absorber to the generator. In the heating cycle, the cooling applied at the absorber and/or the condenser is the heat delivery to the heating load.

As a matter of convenience and terminology herein, each part of the absorption system which operates at the same pressure is termed a chamber.

Conventional absorption refrigeration/heating systems are two chamber systems although three chamber systems appear in the prior art and have seen limited use. When operated as a heat pump two chamber systems give respectable heating performance but give poor cooling performance.

Using ammonia ($NH_3$) as the refrigerant and water ($H_2O$) as the sorbent, heat pumping can occur from an ambient air source which is at temperatures below freezing. In a theoretical assessment where the air is treated as if it were dry so that no defrosting is necessary, the typical two chamber $NH_3/H_2O$ heat pump would represent a significant improvement over what would be expected of a simple furnace. However, since heat pumps are more expensive than furnaces, cooling season performance benefits are needed to justify the added expense. In other words, the heat pump must act as an air conditioner also to offset the cost of a separate installation of an air conditioner with the furnace.

For cooling, an NH$_3$/H$_2$O system is predicted to have a COP equal to about 0.5. This low performance index causes unreasonable fuel (or energy) costs from excessive fuel (or energy) use. This low performance of the ammonia/water system results from the poor performance characteristics of the ammonia/water solution at the higher temperature ranges, if the heat is supplied to the absorption system at higher temperatures.

Three-chamber systems of various types have been suggested which would improve the performance by staging the desorption process into effects. This would allow for increasing the actual temperature at which the driving heat is added to the system (cycle). The reference Carnot cycle efficiency would be increased and the real cycle would follow suit. Until the present invention it was thought that this increase in temperature would represent an unreasonably high pressure, especially for ammonia/water systems, and would force the system to operate in regions for which data is not readily available.

In addition the pressure has tended to rule out ammonia/water in a three-chamber system. The search for organic material such as halogenated hydrocarbons and other refrigerants as a replacement for the ammonia has been limited by fluid stability at these higher temperatures. Normal organic refrigerant stability tests have indicated that it is necessary for oil to be present for operation in vapor compression refrigeration systems. These high operating temperatures rule out most of the common refrigerants, particularly being heated directly by combustion products which often cause local hot spots, which result in working fluid degradation and/or corrosion of components.

U.S. Pat. No. 4,441,332—Wilkinson is an example of a four-chamber absorption refrigeration system to provide refrigeration and/or heat pump total capability. This prior art patent employs two chemically separated two-chamber systems which are mechanically integrated into a total system to take advantage of the high performance of one solution pair in a low temperature range for cooling and the advantages of the other solution pair in a high temperature range when the total system is heat pumping in the heating mode.

The invention described herein is an integrated three-chamber system having one solution pair using an organic material of unusual fluid stability at higher temperatures when manipulated in an apparatus and system to take advantage of its properties. The typical preferred solution pair for operation as part of the system and components of this invention is ammonia as the refrigerant and sodium thiocyanate as the absorbent.

Others have given consideration to this solution pair as examplified by the ASME publication "Performance of A Solar Refrigeration System Using Ammonia—Sodium Thiocyanate", by Swartmen et al., in Nov. 1972 and the publication entitled "A Combined Solar Heating/Cooling System", by Swartmen and presented July 28–Aug. 1, 1975 at the 1975 International Solar Energy Congress and Exposition and U.S. Pat. No. 3,458,445—Macriss et al.

The heat actuated, air cooled, double effect generator cycle absorption refrigeration system of this invention overcomes limitations of the existing prior art technology. The air cooled system of this invention eliminates the need for cooling water and the use of ammonia as the refrigerant avoids refrigerant freezing during heating operation. The double effect generator cycle permits high efficiency through internal heat recovery in the absorption refrigeration circuit. The use of sodium thiocyanate as the absorbent eliminates the need for analyzers and rectifiers to purify the refrigerant stream. Internal refrigerant flow reversal, to achieve heat/cool switching and defrosting, eliminates the need for intermediate water/antifreeze heat transfer loops to switch from heating to cooling operation.

SUMMARY OF THE INVENTION

A combination of a double effect generator absorption cycle, the thermo/physical properties of which are enhanced by the application of the sodium thiocyanate/ammonia absorbent/refrigeration pair, with the arrangement of a reverse cycle air cooled double effect refrigeration circuit with generator and heat exchanger in a stacked coil configuration including tube in tube concepts, together with the combination of energy recovery motors to contribute to the power requirement of the solution pump and means for positioning the refrigerant reversing valve(s) to provide warm refrigerant vapor through the refrigerant to air heat exchanger while still producing heat from the system as a way of defrosting the refrigerant to air heat exchanger when outside air temperatures are low.

The invention includes an absorption refrigeration and/or heating process wherein a highly volatile chemically and thermally stable refrigerant (ammonia) is alternately absorbed in and expelled from an absorbent (sodium thiocyanate) with the process conducted as a double effect system in the generator section.

In further summary, the invention includes an absorption refrigeration and/or heating system in connection with a cooling or heating load, and a heat sink or source, preferably ambient air, to selectively provide heat to or remove heat from the load, comprising:

(a) a multiple effect generator means to heat an absorbent solution pair comprising a nonvolatile absorbent and highly volatile refrigerant which is soluble in the absorbent and to desorb a portion of the refrigerant from the pair, the generator means comprising a first vessel constructed to receive sufficient heat of combustion to desorb refrigerant from the pair, and at least one additional vessel connected to the first vessel to receive the refrigerant and exchange heat from the refrigerant with the solution pair to further desorb refrigerant from the solution pair;

(b) a first heat exchanger means connected between the first and second effect generators and a second heat exchanger means, the first heat exchanger means being constructed to exchange heat between the ambient air in proximity thereto and a fluid therein, and the second heat exchanger means being constructed to exchange heat between the load and a fluid therein, each heat exchanger means selectively connectable to the first and second generator means;

(c) valve means in the connections between the first and second effect generator means, the first heat exchanger means and the second heat exchanger means, selectively:

(i) to cool the load by directing the refrigerant from the first and second effect generator means through the first heat exchanger means to cool the refrigerant by heat exchanger with the ambient air, and to direct the refrigerant from the first heat exchanger means to the second heat exchanger means to cool the load by heat exchange between the refrigerant and the load upon expansion of the refrigerant in the second heat exchanger means, or (ii) to heat the load by directing the refrigerant from the first and second effect generator means through the second heat exchanger means to heat the load by exchange of heat from the refrigerant to the load, and to direct the refrigerant from the second heat exchanger means to the first heat exchanger means to heat the refrigerant by exchange of heat with the ambient air;

(d) an absorption means selectively connectable by the valve means to the second heat exchanger means when the second heat exchanger means is cooling the load according to (c) (i) or to the first heat exchanger means when the second heat exchanger means is heating the load according to (c) (ii); and (e) a pump means connected between an absorber means and the first generator means to transfer the solution to the first generator means at higher pressure.

It is an object of this invention to provide in combination an absorption refrigeration and/or heating system which may be operated either in a heating mode or a cooling mode by interchanging the use of various of components by means of valves and/or controls. Another object of the invention is to operate such a system using a specific solution pair, ammonia as the refrigerant and sodium thiocyanate as the absorbent in a double effect system.

A further object of the invention is to increase the efficiency of an absorption refrigeration and/or heating system by passing the operating solutions through motive units to augment the solution pump and reduce the external power requirements of the system. Still a further object of the invention is to operate an absorption refrigeration and/or heating system. A further object of this invention is to maintain a major portion of the space heating capacity of the system during the defrost cycle. Still a further object is to use the hot working fluid from the absorber in the heating and cooling modes, and the hot working fluid from the second heat exchanger in the heating mode, to preheat domestic hot water. Still a further object is to use the heat pump to preheat domestic water when there is no space heating or space cooling demand. A further object of this invention is to provide an air cooled absorption heat pump with a cooling COP greater than 0.8 and a heating COP greater than 1.5.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which is delineated in the included claims.

DETAILED DESCRIPTION OF THE INVENTION

In the description of this invention, it is important that there is a clear understanding of the meanings of the terms used herein. Otherwise, because of the complexity of the entire system and the use of components from various fields of mechanical, chemical, and electrical arts, the terminology could be confusing in some cases.

Therefore, as used herein the term "strong solution", when speaking of the solution pair refers to that solution that has picked up refrigerant in the absorber and is in progress toward the generator and carries a higher ratio of refrigerant to absorbent than solution which has been desorbed and partially expelled of refrigerant in the generator(s) of the system. Solution from which refrigerant has been expelled is, by contrast, a "weak" or weaker solution holding a lesser ratio of refrigerant to absorbent in solution.

In the three chamber system of this invention, a solution of "intermediate" strength is employed between the generator means. This solution is by definition, weaker than strong solution and stronger than weak solution.

The terms "generator" and "desorber" are synonymous. The term "heat exchanger" defines an apparatus where fluids are passed in close proximity to each other separated only by a usually impervious wall through which the heat from the warmer is conducted to the cooler. Conventionally, it is understood that heat passes from the hot fluid to the cold fluid.

As used herein, the term "heat exchanger" defines apparatus which exchanges heat into or out of the system; i.e., with an external fluid such as ambient outdoor air, or ground water, or air conditioned indoor living space environmental air. Those apparatus which exchange heat within the system are termed "recuperators".

Figure 1:
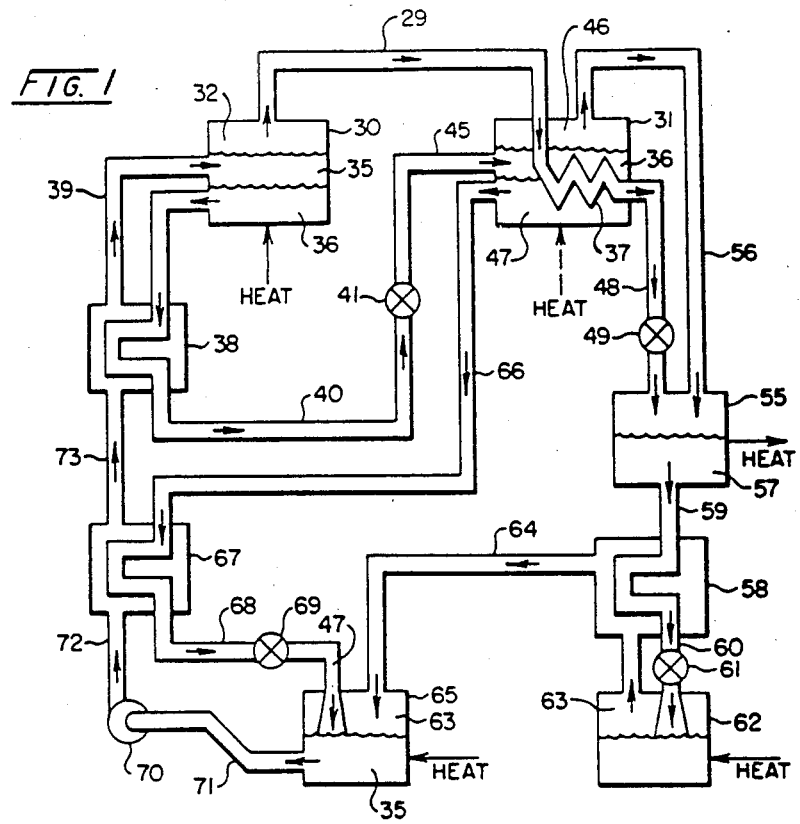
FIG. 1 is a diagram of typical double effect absorption refrigeration cycle system.

Referring to FIG. 1, and as a point of reference, a double effect absorption refrigeration system, is provided with a first effect generator means 30 and a second effect generator means 31, depicted schematically as vessels. The generator means 30 contains a vapor phase of a refrigerant 32 in the system, and a strong liquid phase solution 35 or intermediate solution 36 of the refrigerant with an absorbent. Heat is applied from an external source, such as a gas flame, to the vessel 30 which raises the temperature of the strong solution 35 above the vaporization point at the first pressure in the vessel 30 and provides latent heat of vaporization. Refrigerant vapor 32 is desorbed from the solution 35 and expelled through a connecting conduit 29 to a heat transfer means 37 in the second effect generator means 31.

A weaker, intermediate solution 36 remains in the generator means 30, from which it is conveyed in heat exchange relationship, through a recuperator 38, where heat is transferred to the strong solution 35 that is being conveyed through a connection 39 to the generator means 30. From the recuperator 38, the intermediate solution 36 is conveyed by means of a connection 40 through a throttling valve 41 where the pressure is reduced to a second intermediate pressure and is introduced into the vessel of the second generator means 31 by means of a connection 45.

In the vessel 31 additional heat is transferred to the liquid intermediate solution 36 by means of the heat transfer unit 37. This further raises the temperature of the intermediate solution 36 and adds heat sufficient to expell further vaporous refrigerant 46, leaving a weak solution 47 of the refrigerant and absorbent in the second effect generator means 31.

Although double effect generator systems are the most usually disclosed in the prior art, successive additional generators are also shown, and thus a "multiple" effect system may be considered as an extension of the concepts involved.

In a typical multiple effect absorption refrigeration system, further external heat need not be supplied to the second or successive generators. Beneficial effects can be obtained by further heating of the intermediate solution through heat exchange with the refrigerant vapor 32 from the first effect generator 30. However, external heat depicted in phantom in FIG. 1 may be applied to the vessel 31. Also external heat can be applied to recuperators 38 and 67.

Partially condensed, refrigerant 32, at the pressure of the first (high pressure) chamber is conveyed from the heat transfer unit 37 through a connection 48 and expansion valve 49 into a condenser 55, depicted schematically as a closed pressure vessel in FIG. 1, where heat is transferred to a cooler surrounding medium, which may be the surrounding outside air or water from a cooling tower. Refrigerant vapor 46 which is expelled in generator means 31 is conveyed to the condenser 55 through a connection 56. Condensed liquid 57 is conveyed to a recuperator 58 by means of connection 59 and then by connector 60 to an expansion valve 61. From the expansion valve 61 the refrigerant sprays into a third, low pressure environment of an evaporator 62 where the refrigerant returns to the vapor state by extracting heat from an external fluid medium which is in contact with the evaporator 62. Low pressure refrigerant vapor 63 is conveyed through recuperator 58 where heat is recouped from the liquid 57 passing to the evaporator 62. From the recuperator 58 the low pressure vaporous refrigerant 63 is conveyed through a connection 64 to an absorber 65 where the weak solution 47 has been collected.

After expelling further refrigerant vapor in the second effect generator means 31, the weak solution 47 is conveyed by a connection 66 through a recuperator 67 and a connection 68 to a throttling valve 69. In the recuperator 67 heat is transferred to strong solution 35 as it is conveyed to the first effect generator 30.

In the absorber 65 the refrigerant vapor 63 is absorbed in the weak solution 47 to produce the strong solution 35. In the process, heat is rejected to a surrounding medium, or a working fluid in contact with the absorber.

A solution pump 70 conveys the strong solution through a connection 71, and connections 72, 73, and 39, and through recuperators 67 and 38 to the first effect generator 30.

A double effect absorption system, as shown in FIG. 1, is a three-chamber system, since the second effect generator 31 operates at a pressure intermediate between the higher pressure of the first generator means 30 and the lower pressure of the evaporator 62 and absorber 65.

As described in the Background of the Invention portion of this disclosure, for many years a large variety of proposals have been made for employing a three-chamber system using a single refrigerant pair. Numerous problems exist which have defied satisfactory solution prior to the present invention. One problem not heretofor satisfactorily solved was the identification of an appropriate solution pair in which the pair could operate at the higher temperatures to which the refrigerant could be driven at reasonable pressures in a double effect system. Although ammonia has remained the best prospect for the refrigerant, its absorption in water has proven unattractive because it is difficult to adequately separate the refrigerant and absorbent vapors from the generators of the double effect system without unreasonably complicated equipment.

In this invention ammonia as a refrigerant and sodium thiocyanate as the sorbent are conceived to be an appropriate solution pair in the double effect system. This is especially true in combination with the other features of the applicants' invention to be later described. For instance, the combination refrigeration and/or heating system can be located externally of a living enclosure in an air conditioning/space conditioning usage.

Absorption Refrigeration and Heat Pumping System Containing Ammonia and Sodium Thiocyanate While others have worked with the solution pair ammonia ($NH_3$) as refrigerant and sodium thiocyanate (NaSCN) as absorbent in single effect absorption systems, as previously stated in the Background of the Invention portion of this disclosure, the applicants have conceived the double effect and reversible heating and cooling system using this solution pair. The advantages of this system permit high efficiency through internal heat recovery and mechanical energy recovery in the absorption refrigeration circuit; and the use of sodium thiocyanate as the absorbent eliminates the need for analyzers and rectifiers to purify the refrigerant stream. The refrigerant pair ammonia/sodium thiocyanate is uniquely suited to the system of this invention.

Figure 2:
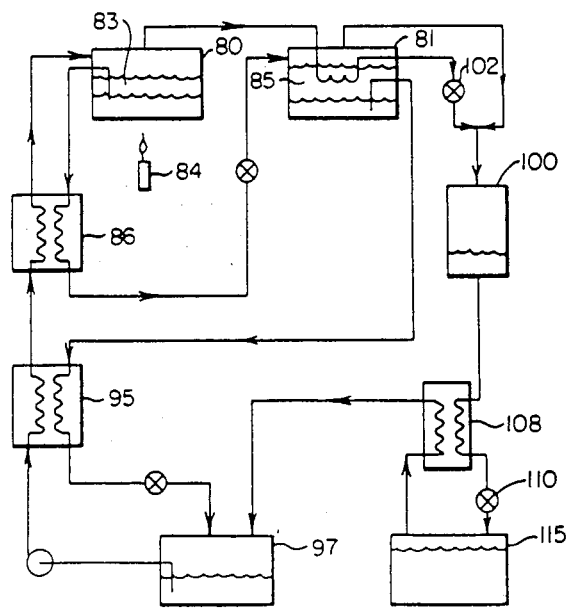
FIG. 2 is a schematic diagram for the absorption cycle of this invention.

Referring to FIG. 2, an operational diagram is shown for the refrigerant and solution for operation in the refrigeration cycle (values are approximately stated). This set of operating conditions would be expected to result in a refrigeration circuit coefficient of performance of approximately 1.0.

At a temperature of about 350° F., strong solution 83 enters the first generator 80 at a pressure of about 1200 psia where it is heated to a temperature of about 370° F. by the external source of heat 84 and refrigerant is desorbed and conveyed into heat exchange relationship with intermediate strength solution 85 in the second generator 81 which is at a pressure of about 270 psia.

The intermediate solution 85 leaves the first generator at a temperature of about 370° F. having been the recipient of direct heat from the source at a rate of about 33,000 btu/hr. and passes through the recuperator 86 where it exchanges heat to the strong solution at a rate of about 56,000 btu/hr. and leaves at a temperature of 220° F. a pressure of 1200 psi. Leaving the recuperator 86 the temperature of the intermediate solution is 220° F. where it is throttled substantially isenthalpically through valve 87 and arrives in the secondary generator 81 at a temperature of 220° F. and a pressure of 270 psia.

In the second generator high pressure vapor is condensed and cooled to 240° F. before entering valve 102 where it is expanded to a saturated vapor and liquid mixture. Approximately 17,000 btu/hr. liberated in this condensation, along with an additional about 6,000 btu/hr. from the flue gases external to the second generator cause additional refrigerant to be desorbed in the second generator, which when mixed with refrigerant from valve 102 go to the condenser at 150° F. and 265 psia.

The condenser expells about 24000 btu/hr., and the refrigerant temperature is reduced to about 85° F. after leaving the recuperator and before entering the expansion valve 110 where its temperature is further reduced to about 42° F. while its pressure is reduced to about 76 psia in the evaporator. The evaporator 115 absorbs 36000 btu/hr., evaporating the refrigerant which enters the recuperator 107 at a temperature of about 50° F. and leaves at a temperature of 110° F. on the way to the absorber 97 which is operating at the lower system pressure of about 70 psia.

Weak solution leaves the second generator 81 at a pressure of 270 psia and a temperature of 240° F. passing through the recuperator 95, and transmitting 39000 btu/hr. to the strong solution 82, which is on the way to the recuperator 86.

Figure 3:
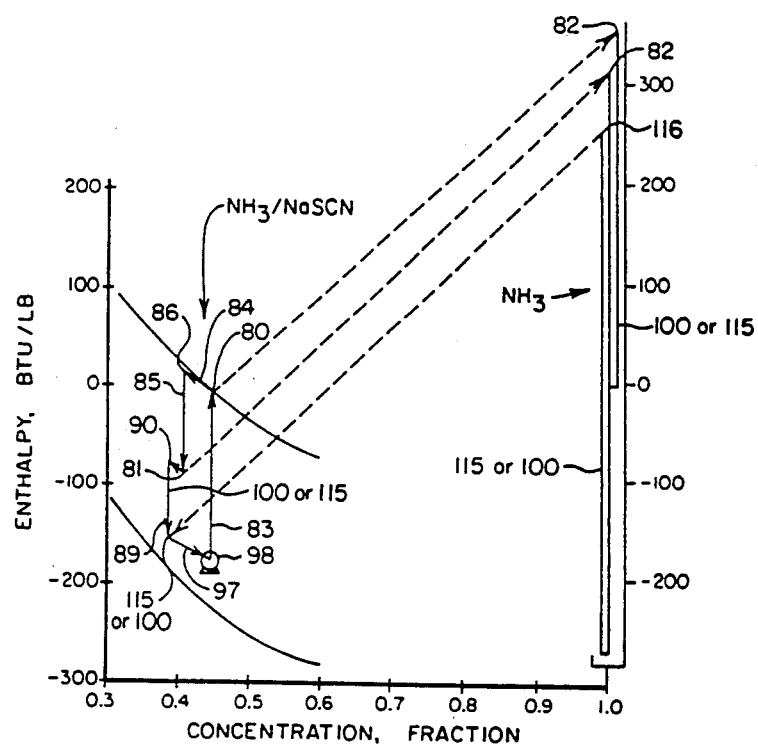
FIG. 3 is a heat versus solution concentration diagram for the double effect absorption cycle of this invention using ammonia as the refrigerant and sodium thiocyanate as the absorbent.

Referring to FIG. 3, an enthalpy diagram for the ammonia/sodium thiocyanate solution is provided showing the component by component changes in solution concentration and enthalpy in the refrigeration circuit.

In the cooling mode, the strong solution 83, at a concentration of about 45 percent ammonia refrigerant, is pumped to the first generator 80 where it is heated by the outside source 84 expelling vapor refrigerant ammonia 82 at an enthalpy of about 350 btu/lb. which is conveyed to the entrance of the second generator 81. The heat content is at its highest point as the intermediate solution 85 enters the recuperator 86 exchanging heat with the strong solution 83 passing from the pump 98 to the first generator 80.

Upon entering the second generator 81 heat is added as further vaporous ammonia is expelled at an enthalpy of about 310 btu/lb.

The further heat added results primarily from heat exchanged from the refrigerant 82, but additional heat from exhaust gas or from another source 90 may also be added.

Heat is extracted in the first or second heat exchanger 100 or 115, which ever is operating as the condenser in the system. The concentration then increases from its lowest level of about 39 percent back to its strong solution concentration of 45 percent in the absorber 97 and is conveyed to the inlet of the solution pump 98.

Other investigators have demonstrated air cooled absorption refrigeration systems using other absorbent/refrigerant pairs.

Existing air cooled absorption refrigeration circuits have demonstrated cooling coefficients of performance as high as 0.5 using various absorbent and refrigerant pairs. These systems have also been demonstrated as heating only heat pumps with a coefficient performance of up to 1.3.

This invention uniquely combines a double effect system using ammonia and an absorbent in a system capable of switching by reversing the functions of the condenser and evaporator heat exchangers 100 and 115. Sodium-thiocyanate is the uniquely preferred absorbent.

This system is an air cooled absorption refrigeration system having a demonstrated cooling coefficient as high as 0.85 using the $NH_3$ and NaSCN refrigerant pair with a burner efficiency of 0.85. Using the double effect generator cycle a high efficiency is provided.

Sodium Thiocyanate and Ammonia with Triethylenetetramine (TETA) as Corrosion Inhibitor The high temperatures and pressures reached in double and multiple effect absorption refrigeration systems is known to produce corrosion problems with the use of the recognized absorbent salts such as lithium bromide. Corrosion inhibitors in absorption refrigeration systems have been sought and used under certain conditions. These prior inhibitors met a measure of success in certain specific operating situations.

Ammonia is well known for its reactivity which in combination with sodium thiocyanate makes for a potentially troublesome solution pair from a corrosion standpoint.

It has been found in the practice of this invention that the addition of TETA ($H_{18}C_6N_4$) in the solution with sodium thiocyanate and ammonia provides a means for inhibiting and controlling corrosion in the high temperature, double effect absorption refrigeration system. The system comprises an absorber, first and second generators, a condenser and evaporator that form a closed, substantially anaerobic system.

The addition to the solution of a TETA corrosion resistor in an amount between about 3.0 to about 0.5 percent by weight has been conceived and found to be very beneficial in results.

As a system of this invention operates in the cooling mode, the absorbent/refrigerant/inhibitor solution composition of about 99 percent absorbent and refrigerant and 1 percent TETA absorbs and desorbs ammonia as shown in FIG. 3 in a range between about 39 to about 45 percent ammonia by weight. The surprisingly favorable results in the operation of the absorption refrigeration system are further enhanced by the corrosion resisting additive. The increase in corrosion resistance has been demonstrated according to the evaluation depicted in FIG. 4.

Corrosion in the double effect absorption refrigeration system results in the liberation of non-condensible gases (predominating hydrogen) which interfere with the efficient operation of the refrigeration circuit and in the separation of particulate corrosion products from the corroding surfaces which can plug flow restrictors and throttling valves and cause rapid wear of pump, motor and valve parts, and ultimately can compromise of the structural strength of the vessels and piping which comprise the sealed refrigeration circuit.

Figure 4:
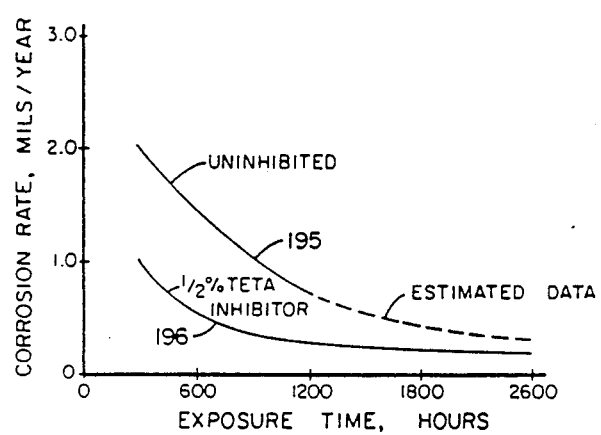
FIG. 4 is a graph of exposure time versus corrosion rate for a solution pair of this invention, with and without the additive material of this invention.

Referring to FIG. 4, which is a plot of corrosion rate versus time, the corrosion rate in the system inhibited with one-half percent TETA declines more rapidly (and reaches a lower stable level) than is the case with the same steel without the inhibitor.

The tests which produced the results shown in FIG. 4 were conducted on an AISI 9260 steel in corrosion inducing contact with a solution pair of ammonia (45 percent by weight) and sodium thiocyanate. The curve 195 discloses data from the tests of the uninhibited solution pair. The curve 196 shows the results of tests conducted in the same conditions except that the solution pair contained the additive TETA as an inhibitor in the amount of one-half percent by weight.

The TETA inhibitor is effective in the vapor space occupied by the refrigerant, and in the liquid space occupied by the solution, as well as at the active surface interface between the spaces, in the autoclave tests summarized in FIG. 4, which simulate conditions in the first effect generator 80.

The TETA inhibitor also improves the lubricity of the solution pair, which extends the life of pump, motor and valve parts.

The following Table B is a table of test results showing the results of three button wear test experiments to demonstrate the increased lubricity of the solution pair when the additive TETA is included. A comparison with generally well known lubricating materials is also shown.

TABLE B
RESULTS OF THREE-BUTTON WEAR EXPERIMENTS

| Test No. | Material Buttons | Environment | Contact Pressure, psi | Running Time, min | Wear Rate (d) Buttons |
|---|---|---|---|---|---|
| 7 | 440C | Heat Transfer Fluid NH$_3$/NaSCN | 2100 | 30 | 0.72 |
| 21 | 440C | Heat Transfer Fluid NH$_3$/NaSCN Plus Additive (b) | 2100 | 60 | 0.35 |
| 20 | 440C | ATF (a) | 1100 | 12 | 78 |
| 22 | 440C | SAE 30 (c) | 1100 | 4 | 150 |

(a) Automatic transmission fluid
(b) Addition of three percent triethylenetetramine (TETA)
(c) Automotive engine oil
(d) In.$^3$ Wear/In. Sliding/Pound Load, × 10$^{12}$ The test results of Table B were obtained on AISI 440C high carbon martensitic stainless steel quenched and tempered with a hardness of R$_c$58-60.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

We claim:

1. In an absorption refrigeration and/or heating process wherein a highly volatile, chemically and thermally stable refrigerant is alternately absorbed in and expelled from an absorbent solution in a double effect process with condensation and alternate evaporation steps being accomplished at ambient air temperatures, the improvement wherein the refrigerant is ammonia and the absorbent is sodium thiocyanate and the solution is conveyed through a plurality of generators arranged in series and refrigerant is expelled from the solution in each generator.

2. The improved process according to claim 1 wherein the process is accomplished utilizing a maximum operating pressure of at least about 1000 psia.

3. The improved process according to claim 1 wherein the refrigerant desorbed in a first of the generators is conveyed through a second of the generators in heat exchange relationship with solution conveyed from the first generator.

4. The improved process according to claim 1 wherein the solution is conveyed from the first generator through a recuperative relationship with solution being conveyed to the first generator, before being conveyed to the second generator.

5. The improved process according to claim 3 wherein the refrigerant from the first generator is conveyed from the second generator through an expansion valve before being conveyed to a condenser, and is reduced in pressure to the pressure of the refrigerant in the second generator; and the refrigerant from the second generator is conveyed to the condenser.

6. The improved process according to claim 5 wherein the weak solution is conveyed from the second generator through a recuperative relationship with the strong solution being conveyed to the first generator.

7. In an absorption refrigeration and/or heating process according to claim 5, the improvement which comprises:
   (a) conveying the condensed refrigerant from the condenser to an evaporator through an expansion valve which reduces the pressure from that of the condenser to a pressure which evaporates the refrigerant in the evaporator;
   (b) the refrigerant in the evaporator is conveyed in heat exchange relationship with a load in the refrigeration process or a secondary heat source in the heating process; and
   (c) the refrigerant from the evaporator is conveyed to an absorber.

8. In a process according to claim 1, the further improvement wherein the absorbent solution contains an additive, comprising triethylenetetramine.

9. A process according to claim 8 wherein the solution comprises about 45 percent by weight ammonia, about 54 percent by weight sodium thiocyanate, and about 1 percent by weight triethylenetetramine.

10. In an absorption refrigeration and/or heating process wherein
   a highly volatile, chemically and thermally stable refrigerant is alternately absorbed in and expelled from an absorbent solution in a double effect process with condensation and alternate evaporation steps being accomplished at ambient air temperatures, the improvement wherein the refrigerant is ammonia and the absorbent is sodium thiocyanate, and
   the solution is conveyed through a plurality of generators arranged in series and refrigerant is expelled from the solution in each generator, and
   the refrigerant desorbed in a first of the generators is conveyed through a second of the generators in heat exchange relationship with solution conveyed from the first generator, and
   the solution is conveyed from the first generator through a recuperative relationship with solution being conveyed to the first generator, before being conveyed to the second generator, and
   wherein the solution passing from the first generator in recuperative relationship with the solution flowing through the generators is conveyed through an isanthalpic throttling valve and reduced in pressure to a pressure suitable for desorption in the second generator by heat transmission from the refrigerant in the second generator.

* * * * *